United States Patent

Mat

Patent Number: 6,076,656
Date of Patent: Jun. 20, 2000

[54] CONVEYOR BELT SCRAPERS

[76] Inventor: Ghislain Justin Marie Mat, Plot 91, Bultfontein, Lanseria, Krugerersdorp District, 1739, South Africa

[21] Appl. No.: 09/029,083

[22] PCT Filed: Sep. 27, 1996

[86] PCT No.: PCT/EP96/04228

§ 371 Date: Feb. 20, 1998

§ 102(e) Date: Feb. 20, 1998

[87] PCT Pub. No.: WO97/14635

PCT Pub. Date: Apr. 24, 1997

[30] Foreign Application Priority Data

Oct. 13, 1995 [ZA] South Africa .......................... 95/8657

[51] Int. Cl.⁷ .................................................. B65G 45/00
[52] U.S. Cl. ................................................................ 198/499
[58] Field of Search ............................................... 198/499

[56] References Cited

U.S. PATENT DOCUMENTS

| 1,159,129 | 11/1915 | Tellefson . |
| 3,952,863 | 4/1976 | Schattauer .......................... 198/230 X |
| 4,694,952 | 9/1987 | Meijer ..................................... 198/499 |
| 5,014,844 | 5/1991 | Anottnen ................................ 198/499 |

FOREIGN PATENT DOCUMENTS

| 0 486 112 | 5/1992 | European Pat. Off. . |
| 2.226.338 | 11/1974 | France . |
| 39 08 873 | 11/1989 | Germany . |
| 2 125 357 | 3/1984 | United Kingdom . |
| 2 165 200 | 4/1986 | United Kingdom . |
| WO 87/05585 | 9/1987 | WIPO . |
| WO 93/04959 | 3/1993 | WIPO . |

Primary Examiner—Christopher P. Ellis
Assistant Examiner—Kenneth W Bower
Attorney, Agent, or Firm—Andrea G. Reister; Howrey & Simon

[57] ABSTRACT

The invention concerns a conveyor belt scraper used to scrape debris from the surface of a conveyor belt (10). The scraper incorporates a segmented scraper blade which includes individual blade segments (22) arranged side by side with one another such that in use each blade segment scrapes a portion of the width of the belt surface. For blade segment there is a blade segment support (28) on which the associated blade segment (22) is supported. Each blade segment support (28) includes pivotally interconnected links (30, 32, 34, 36) forming a closed parallelogram linkage. A support structure (42, 82) is provided to support the parallelogram linkages in side by side relationship adjacent the belt surface. Gas-inflatable biasing means (44, 58) act on the parallelogram linkages such that inflation thereof causes the linkages to deform in a manner to displace the blade segments (22) in a direction lengthwise of the belt (10) and towards the belt surface. During such displacement, each blade segment (22) moves parallel to itself and maintains a constant inclination to the vertical.

29 Claims, 4 Drawing Sheets

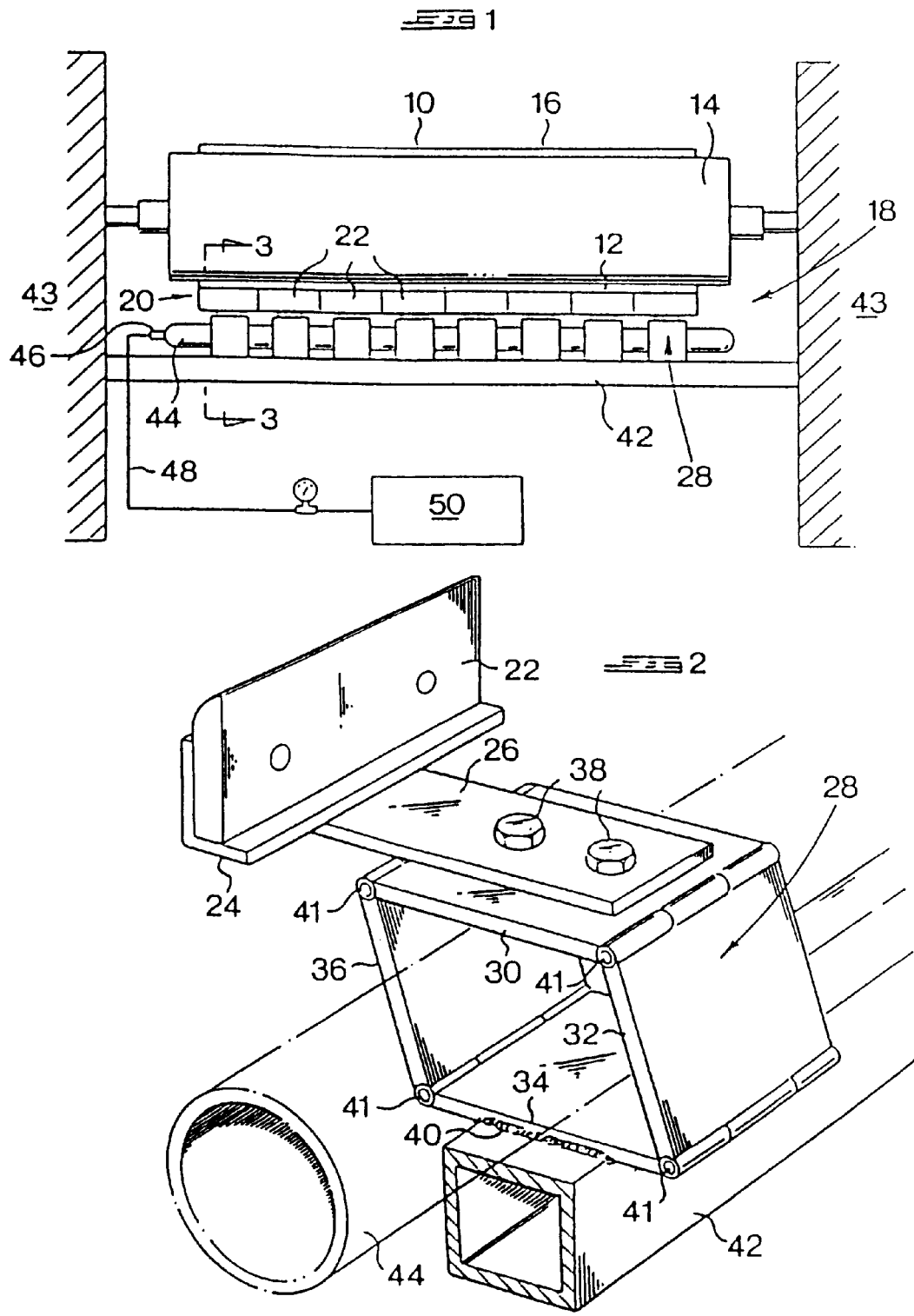

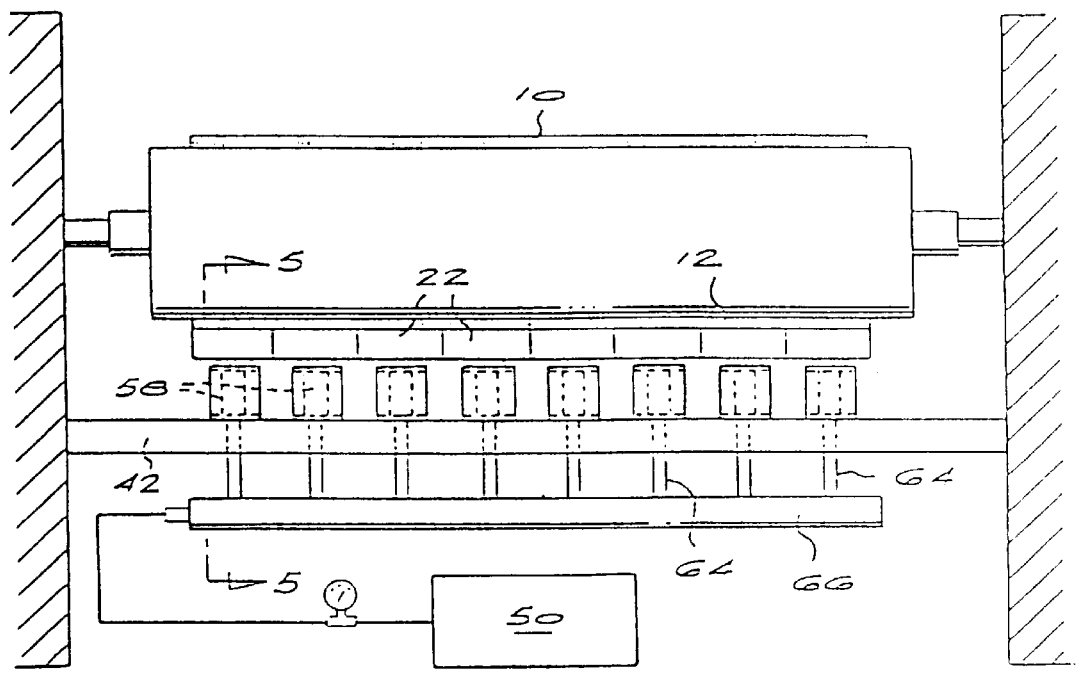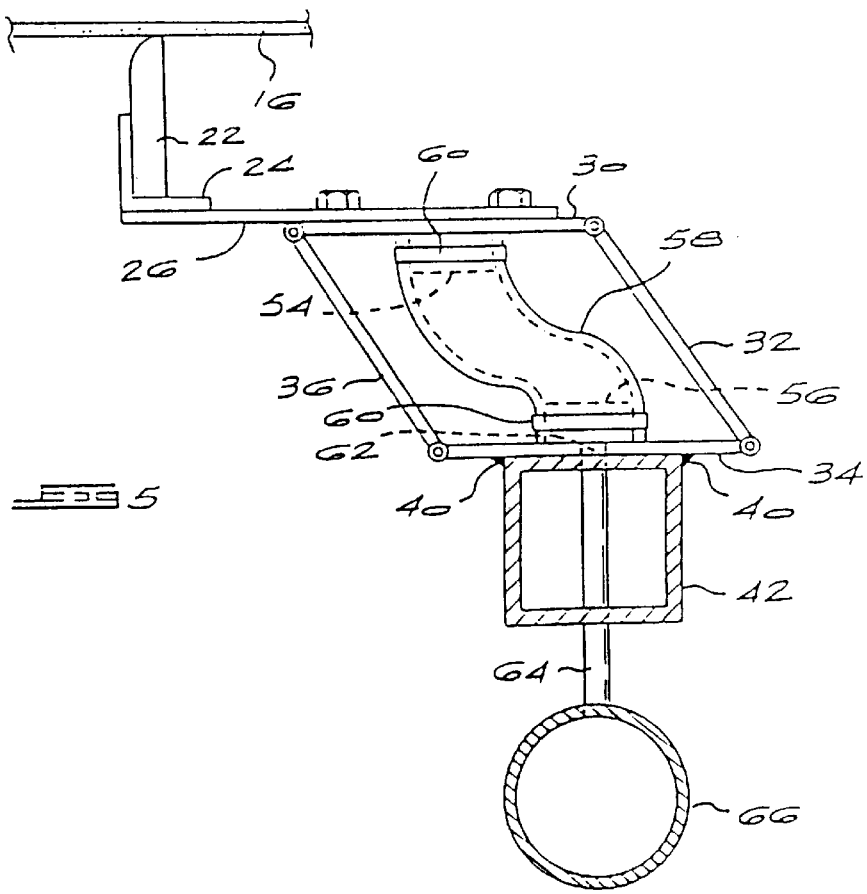

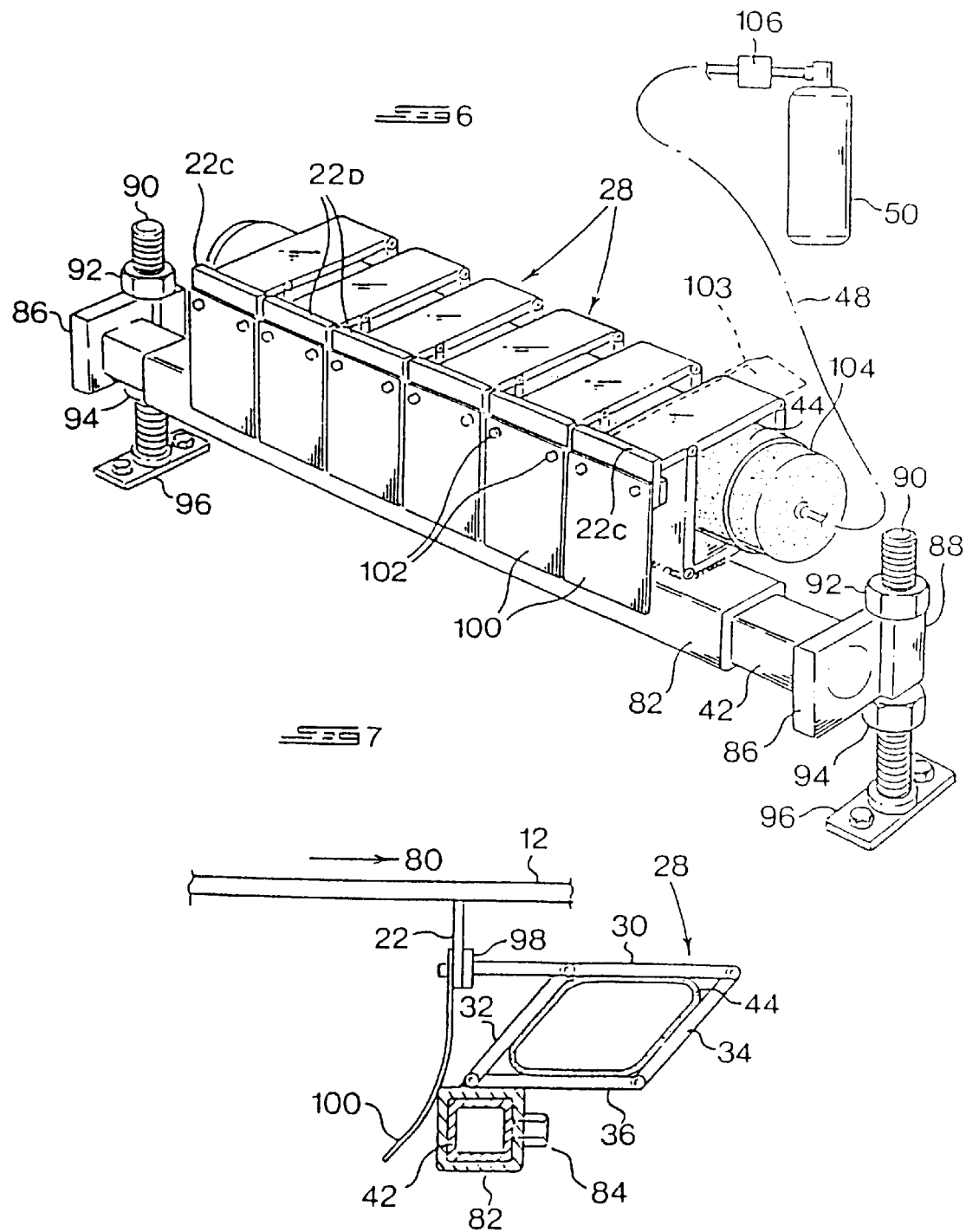

CONVEYOR BELT SCRAPERS

BACKGROUND TO THE INVENTION

THIS invention relates to conveyor belt scrapers.

To avoid spillage, conveyor belts are not generally loaded to full capacity. Thus the material which is being conveyed on the belt is located on the central region of the upper run of the belt and very little, if any, material is in contact with the lateral extremities of the belt. On the return run of the belt, one or more scrapers are arranged to scrape any adhering material from the belt surface. For instance, a scraper may be positioned generally below the head or discharge roller where the belt is initially reversed on the return run.

Known belt scrapers either have a one-piece or segmented scraper blade, the latter being composed of a series of side-by-side blade segments, arranged to scrape the full width of the belt on the return run. Because little if any material was initially in contact with the lateral extremities of the belt on the upper run, the ends of the scraper blade are required to perform only a minimal scraping action. The central region of the scraper blade is required to perform the majority of the scraping action. The end result is that the ends of the blade are subjected to less abrasive wear than the central region of the blade, and hence wear down less rapidly.

In most known scraper systems the blade is initially urged upwardly against the belt with a predetermined force so that the desired scraping action can be achieved. The blade is usually mounted fast on a rigid cross-bar spanning between adjustable structures located to the sides of the belt. The adjustable structures can be adjusted to move the cross-bar, and hence the scraper blade, upwardly against the belt. However, the above-mentioned phenomenon of differential rates of wear between the central and end regions of the blade makes it impossible in conventional practice to adjust the crossbar in such a way that all regions of the worn blade are loaded equally against the belt. Since most of the scraping action takes place in the central region of the belt, it often happens that the ends of the blade are excessively loaded in order to obtain an acceptable upward load on the more worn central region of the blade or, in the case of a segmented blade, on the more worn, centrally located blade segments.

EP 0 486 112 A1 describes a conveyor belt scraping apparatus in which a series of scraper blade segments are carried by vertical shafts which are located slidably in tubular guides and which are biased upwardly against the belt by inflation of an elastic tube against which the lower ends of the shafts bear. A serious drawback of this arrangement is the fact that the shafts can easily jam in the guides, particularly if any dirt is allowed to enter the guides.

WO 93/04959 describes a somewhat similar arrangement in which individual blade segments are urged upwardly against the belt by individual gas springs, possible fouling of the individual mechanisms once again being a potential problem.

Another proposal, described in GB 2 165 200 A, is an arrangement in which a non-segmented blade is connected at each end to a pivoted linkage which is acted upon by a gas spring which operates the linkage, through a crank, in a manner to urge the blade against the belt. The problem here is that the blade is loaded only at its ends, resulting in non-uniform scraping of the belt and/or wear of the blade, as described above.

SUMMARY OF THE INVENTION

According to the present invention there is provide a conveyor belt scraper comprising:

a segmented scraper blade which includes a plurality of blade segments arranged side by side with one another such that in use each blade segment can scrape a portion of the width of a conveyor belt surface, a plurality of blade segment supports on which the blade segments are supported, each blade segment support including a linkage of pivotally interconnected links forming a closed parallelogram linkage, a support structure for supporting the parallelogram linkages in side by side relationship with one another and adjacent the conveyor belt surface which is to be scraped, and gas-inflatable biasing means acting on each of the parallelogram linkages such that inflation thereof causes the linkages to deform in a manner to displace the blade segments in a direction lengthwise of the belt and towards the belt surface, each blade segment moving parallel to itself and maintaining a constant inclination to the vertical during such displacement.

In the preferred embodiments of the invention, the gas-inflatable biasing means comprises a flexible, inflatable tube extending, in a direction transverse to the length of the conveyor belt, through all of the parallelogram linkages. In this case, the fully inflated diameter of the tube is greater than or equal to the clear internal dimension of each parallelogram linkage. A source of compressed gas is provided for inflating the tube, and also means for regulating the pressure of the compressed gas to a substantially constant value at least during normal operation, thereby to maintain a substantially contact pressure of the blade segments on the belt surface.

In other embodiments of the invention there are separate, flexible, inflatable hoses located inside the linkages, the ends of the hoses being attached to opposite links of the associated linkages such that inflation of the hoses causes them to straighten out with resultant deformation of the linkages in a manner to displace the blade segments towards the belt surface. In these embodiments it is possible to exercise individual control over the contact pressure of the blade segments on the belt segments by an arrangement in which the hoses are inflatable independently of one another. More convenient however is an arrangement in which all the hoses are connected to a manifold through which all the hoses are simultaneously inflatable. As in the single tube embodiments, there is typically a source of compressed gas for inflating the hoses and means for regulating the pressure of the compressed gas to a substantially constant value.

In each of the embodiments, the source of compressed gas is most conveniently a pressure vessel charged with air under pressure, but in alternative arrangements the source may be an air compressor.

More sophisticated embodiments of the invention may comprise a metal detector for detecting metal projections on the belt surface and control means operating in response to such detection to decrease the inflation pressure of the gas inflatable biasing means temporarily during passage of the metal projections past the scraper blade, thereby avoiding shock loading on the scraper blade segments which could damage them.

Further according to the invention there is provided a conveyor belt scraper comprising:

a segmented scraper blade which includes a plurality of blade segments arranged side by side with one another such that in use each blade segment can scrape a portion of the width of a conveyor belt surface, for each segment of the scraper blade, a blade segment support on which the blade segment is supported, each blade segment support including a linkage of pivotally interconnected links forming a closed parallelogram linkage, a support structure for supporting the parallelogram linkages in side by side relationship with one another and adjacent the conveyor belt surface which is to be scraped, and an elongate, resilient biasing member, typically in the form of a tube and extending, in a direction transverse to the length of the conveyor belt, through all of the parallelogram linkages so as to bias the linkages in a manner to urge the blade segments towards the belt surface.

Typically each closed parallelogram linkage comprises upper and lower, links which are generally parallel to the belt surface and parallel side links which transverse to the belt surface and spaced apart from one another in the lengthwise direction of the belt, the side links being connected pivotally between the upper and lower links and the upper link including an extension carrying a bracket to which an associated scraper blade segment is releasably attached. This has the advantage of locating the blade segments laterally away from the associated linkages and reduces the likelihood of fouling of the linkages by debris which is scraped from the belt surface. Addition security against fouling in this way is provided by protective flaps, attached to the blade segment support brackets, which deflect scraped debris away from the linkages.

The support structure of the scraper will usually comprise a cross-bar which spans across the width of the conveyor belt and has its ends connected to height-adjustable structures on either side of the belt, the parallelogram linkages being mounted to the cross-bar.

BRIEF DESCRIPTION OF THE DRAWINGS

The invention will now be described in more detail, by way of example only, with reference to the accompanying drawings in which:

FIG. 1 shows a view, looking in the direction of conveyor belt movement, of a conveyor belt scraper according to a first embodiment of the invention;

FIG. 2 shows a perspective view illustrating the mounting of a single blade segment in the conveyor belt scraper of FIG. 1;

FIG. 4 shows a view similar to that of FIG. 1 but of a second embodiment of the invention;

FIG. 5 shows a cross-sectional view, similar to that of FIG. 3, at the line 5—5 in FIG. 4;

FIG. 6 shows a perspective view of a modified embodiment of the invention; and

FIG. 7 shows a cross-section at the line 7—7 in FIG. 6.

DESCRIPTION OF EMBODIMENTS

Figure 3:
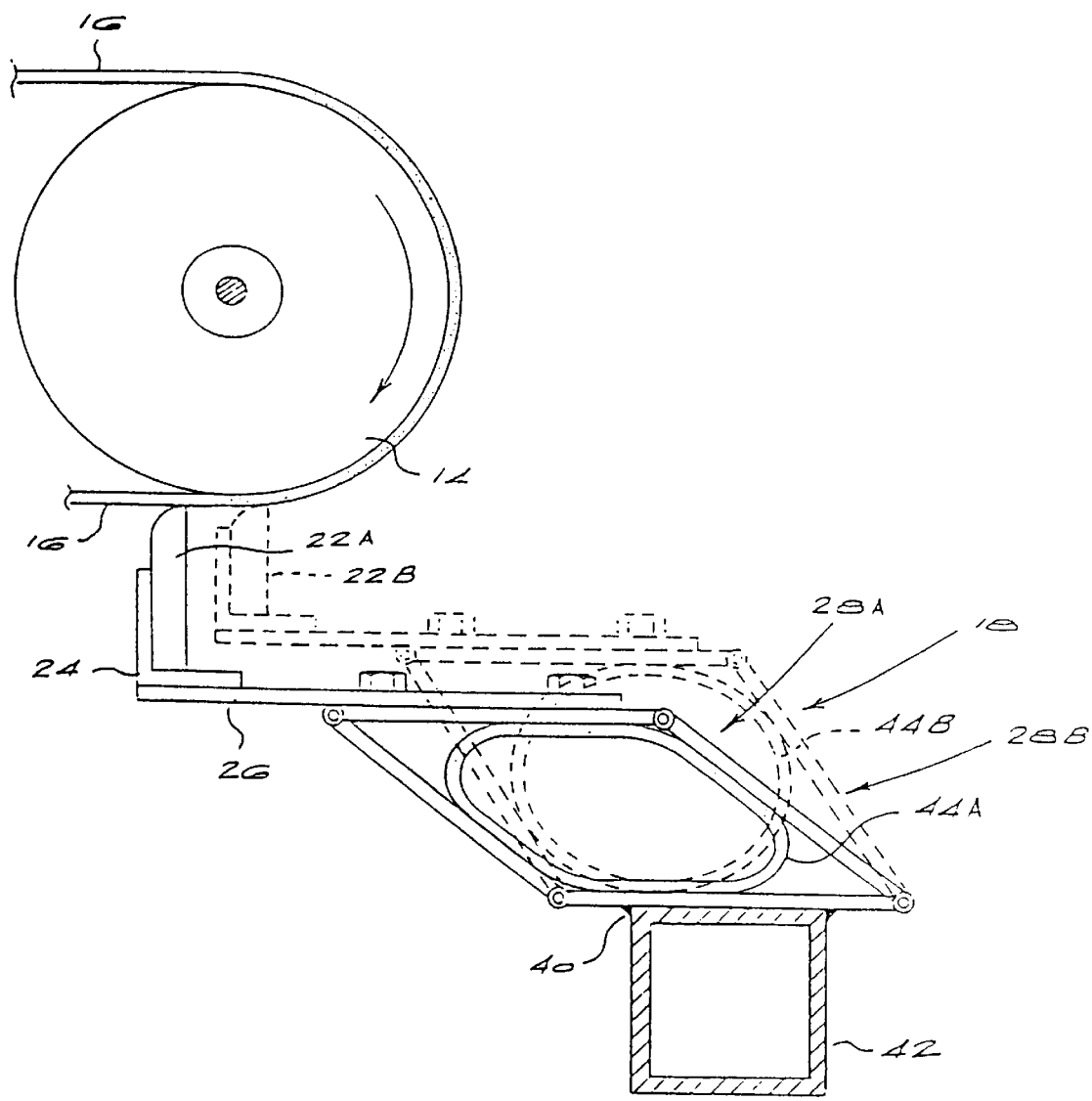
FIG. 3 shows a cross-sectional view at the line 3—3 in FIG. 1.

In FIG. 1, the upper and lower runs of an endless conveyor belt are indicated with the reference numerals 10 and 12 respectively. The belt is shown passing around a head or discharge roller 14. In operation of the conveyor belt, particulate material such as coal is conveyed on the surface 16 of the belt which, in the case of the upper run 10, is the upper surface. After the belt has passed around the head roller 14, the surface 16 is the underside of the belt. The conveyor belt scraper of the invention, indicated generally with the reference numeral 18, is used to scrape adhering matter from the surface 16 as the return run 12 passes beneath the roller 14.

The conveyor belt scraper 18 has a scraper blade 20 of segmented construction, i.e. it is made up of a series of side by side scraper blade segments 22. The blade segments may be made of any conventional, hard material used for conveyor blade scrapers such as, for instance, a ceramic material.

Each of the blade segments 22 is carried by a blade holder 24. Each blade holder 24 is connected to a bar 26 which is in turn mounted to a blade segment support indicated generally by the numeral 28. Each blade segment support 28 is in the form of a parallelogram linkage composed of four rigid links 30, 32, 34 and 36 which are freely hinged to one another at the corners of the parallelogram. The bar 26 is mounted to the upper link 30 of the parallelogram by means of bolts 38, as illustrated. The lower links 34 of the parallelogram linkages are welded at 40 to a rigid cross-bar 42 which spans across the width of the conveyor belt and the ends of which are connected to support structures 43 on either side of the belt.

The links 30, 32, 34 and 36 of the parallelogram linkages are made of rigid steel plate and carry tubular formations at their ends which are intercalated with one another. Pins 42 pass in rotatable manner through the intercalated formations to form hinged connections at each corner of the parallelogram.

A flexible tube 44 passes through all of the parallelogram linkages. The tube 44 is typically of heavy-duty, air impermeable construction and is sealed at both ends. The tube may conveniently a length of fire hose which, prior to inflation, has a flat configuration. At one end, the tube carries an inflation nipple 46 to which an inflation hose 48 is connected. The hose 48 is used to inflate the tube 44 with compressed air from a source 50. The source 50 may, for instance, be an air compressor, typically electrically powered. Alternatively, the source 50 may be a pressure vessel containing air under pressure.

FIGS. 2 and 3 illustrate a blade segment support 28 once the tube 44 has been inflated with air under pressure. Prior to inflation, the freely hinged nature of the parallelogram allows it to assume a collapsed configuration. Because of the parallelogram configuration of each support 28 the upper links 30 are always parallel to the lower links 34. This ensures that the blade segments 22 mounted to the supports 28 always maintain the same inclination to the vertical. The inclination of the blade segments will thus be the same for all segments and will be chosen to suit the particular scraping action to be undertaken by the scraper 18.

The tube 44 can assume a round cross-section when fully inflated with air and its outside diameter when fully inflated is typically greater than the clear internal dimension of a support 28 when the support is in a rectangular configuration. Generally, the diameter of the tube is chosen in relation to the internal dimensions of the blade segment supports such that, as the tube 44 is inflated, the blade segment supports are caused by the tube to deform from their collapsed condition to an operative condition as seen in FIG. 3. This deformation of the blade segment supports raises the associated blade segments 22 into contact with the belt surface 16 to perform a scraping action on that surface. The inflation pressure determines the force with which the blade segments are pressed against the belt surface.

An advantage of the invention as exemplified above is the fact that the inflation of the tube 44 with compressible air enables lacing clips or the like, which stand proud of the normal belt surface 16, to pass over the blade segments without causing undue damage either to themselves to the blade segments. If a blade segment encounters a pronounced clip or other rigid projection on the belt surface 16, the downward reaction force on the segment will merely cause greater compression of the air in the tube so that the segment can deflect downwardly to allow passage of the clip or projection. Thus the tube acts in the manner of a shock-absorber for the blade segments.

A further, possibly more important advantage arises in situations where certain blade segments, typically those located centrally, have worn down more than other blade segments, typically those towards the edges of the belt. The full lines in FIG. 3 illustrate a longer, i.e. less worn, blade segment 22A near to the edge of the belt and the broken lines illustrate a shorter, i.e. more worn, blade segment 22B nearer to the centre of the belt. As can be seen the parallelogram linkage of the blade support 28A of the blade segment 22A has deformed less towards a rectangular configuration than the blade support 28B of the blade segment 22B. Thus the inflated hose 44 biases the blade segment 22B upwardly through a greater distance than the blade segment 22B while still bringing both blade segments into contact with the belt surface 16. This is because where the tube 44 passes through the blade support 28B it has assumes a shape closer to a circular shape than where it passes through the blade support 28A, as will be appreciated from a comparison of the respective shapes of the tube indicated by the numerals 44A and 44B.

It will also be noted that the operation of the parallelogram linkage is such that the shorter blade segment 22B has been displaced slightly relative to the blade segment 22A in the longitudinal direction of the belt. FIG. 3 is somewhat exaggerated, for clarity of illustration, in so far as this displacement is concerned. However, although the various blade segments making up the blade 20 will not be perfectly aligned with one another across the belt if they have different lengths, they will in combination still perform a scraping action across the full width of the belt.

Another advantageous feature of the invention as exemplified above is the fact that all the blade segments 22 will be biased against the belt with approximately the same biasing force, as determined by the inflation pressure of the hose. There may be slight variations from one segment to another as a result of the different degrees of deformation of their respective parallelogram linkages and resultant, slightly different components of upward force on the relevant links of the linkages. In general however, the amount by which one blade segment is worn down relative to another will not be great, so the amount of deformation which each blade support 28 undergoes on inflation of the hose, and hence the resultant upward force on the blade segment will be generally the same for all blade segments.

It will accordingly be appreciated that the invention, as exemplified above, provides a means whereby all segments of a segmented blade can be biased against the belt surface with substantially the same force and at a constant angle relative to the belt surface, even if some blade segments have worn more than others.

Many variations are possible. For instance, there may be a control apparatus to ensure that the same pressure is maintained in the tube 44 at all times. The control apparatus could include a pressure sensor sensitive to the pressure of the air in the tube. In cases where the source 50 is an air compressor, a control could be arranged to switch on the compressor, thereby to pump more air into the tube, if the sensor detects that the internal tube pressure has, for any reason, dropped below a desired value. In cases where the source 50 is a pressure vessel, there may be a solenoid or other valve which opens automatically to admit more air to the tube from the vessel if the sensor detects an inadequate internal pressure. In other cases the hose 48 may simply include a pressure gauge 52 to indicate the current tube pressure to an operator. When he sees that the tube is inadequately pressurised, the operator merely switches on the compressor or manually opens a valve on the pressure vessel to admit more air to the tube and bring the pressure therein to the desired value.

Mention has been made of the damage which can be caused to the lacing clips which are used to connect lengths of the conveyor belt to one another. In a sophisticated version of the invention, the scraper could include a metal sensor arranged upstream of the blade 20 to detect the passage of a lacing clip. On such detection by the metal detector, a control arrangement actuates an exhaust valve on the tube so that some air is vented from the tube, thereby decreasing its pressure and increasing the ability of the blade segments to deflect when the clip arrives at the blade location. Immediately after passage of the clip, the control arrangement automatically re-inflates the tube to the normal operating pressure.

FIGS. 4 and 5 illustrate a second embodiment of the invention in which air inflation is also used to deform the parallelogram linkages of the blade segment supports but in which such inflation is achieved without the use of a single tube 44 extending through all the linkages. In these Figures, components corresponding to those seen in FIGS. 1 to 3 are designated with the same reference numerals.

In FIGS. 4 and 5, a round disc 54 is welded to the underside of the link 30 of each parallelogram linkage. Welded to the top surface of the link 34 is a round disc 56 of the same diameter. The ends of a flexible hose 58 are located about the discs and are secured there in airtight manner by circumscribing clamps 60 which may, for instance, be in the form of Jubilee clips. A port 62 is formed through the lower disc 56 and through the link 34 and communicates with the interior of the airtight hose 58. An inflation nipple 64 is connected to the port and to a manifold 66. The manifold 66, which is connected to the source 50, thus serves all the hoses 58. As in the first embodiment, the source 50 may be an air compressor or a pressure vessel charged with air under pressure.

The freely hinged nature of the links 30, 32, 34 and 36, together with the flexibility of the hoses 58, enables the blade segment supports to assume a collapsed configuration before the hoses 58 are pressurised. The straight length of each hose 58 is typically equal to or longer than the clear spacing between the links 30 and 34 when the parallelogram linkage of the blade segment is in a rectangular configuration.

When the hoses 58 are inflated with air under pressure from the source 50, the internal pressure in each hose causes it to straighten out. This has the effect of deforming the parallelogram linkage of each blade segment support out of its collapsed state and towards a rectangular shape. The link 30 is accordingly forced upwardly relative to the link 34. The associated blade segment is accordingly also biased upwardly against the belt surface 16. Thus all the blade segments are simultaneously biased against the belt surface.

The advantages described above for the first embodiment are also present in the embodiment of FIGS. 4 and 5. The parallelogram linkages of the blade segment supports 28 ensure that all the blade segments have, and retain, the same inclination to the vertical. In this case, with the same inflation pressure applied to all the hoses 58 simultaneously, the force with which each blade segment is biased against the belt surface 16 will be generally the same, irrespective of whether some of the blade segments are more worn than others. The shorter, i.e. more worn, blade segments are, as before, biased upwardly through a greater distance than the longer, i.e. less worn, blade segments.

The compressibility of the air in the hoses 58 allows the individual blade segments to deflect as necessary if struck by a projection on the belt surface 16. The facility for instantaneously reducing the pressure in the tube 44 of the first embodiment, to allow passage of lacing clips in the belt without undue damage, could also be included. In this case, the pressure in all hoses 58 would be reduced simultaneously in response to upstream detection of a clip.

The embodiment of FIGS. 4 and 5 has the facility for a further variation which would not be possible with the embodiment of FIGS. 1 to 3. Instead of pressurising all hoses 58 with the same pressure, it would be possible to provide each of the hoses with an independent source of compressed air, enabling, if required, different biasing forces to be applied to the different blade segments. This would, of course, considerably increase the complexity and cost of the apparatus.

As indicated previously, many variations are possible within the scope of the invention. For instance, in the illustrated embodiments inflation of the tube 44 or hoses 58 causes the parallelogram linkages to deform from a collapsed state in a clockwise direction as viewed in FIGS. 3 and 5. In other embodiments, deformation could take place in an anticlockwise direction as viewed in these Figures. In such cases, the bar 26 of each blade segment support 28 would extend in the opposite direction to that seen in FIGS. 3 and 5.

Also, although mention has been made of gas, typically air, inflation of the tube 44 or hoses 58, it is also within the scope of the invention for the tube or hoses to be inflated partially with a liquid and partially with a gas. In such cases the liquid would be one which inhibits leakage of the gas from the tube or hoses through osmosis or through pores which may exist in the material of which the tube or hoses are made, possibly by forming a lining on the internal surface of the tube or hoses. It is believed that a suitable liquid would be a water/paraffin emulsion.

The liquid could be introduced into the tube 44 or hoses in any convenient manner, either separately from, or together with, the compressed air or other gas. Irrespective of the manner in which the liquid is introduced, the tube 44 or hoses 58 will contain sufficient compressed air or other gas to enable the blade segments to deflect as necessary in use.

A further feature of the embodiments illustrated in the drawings is the facility for ready detection of the amount of wear undergone by each blade segment. It will be appreciated that the inclination of the links 32 and 36 is dependent on the configuration of the parallelogram linkage at any given time. This is in turn dependent on the distance through which the blade segment has been upwardly biased in order to contact the belt surface 16, and hence on the vertical dimension of the blade segment. Thus by observing the inclination of the links 32 and 36 an operator can determine rapidly how much wear each blade segment has undergone. When the links 32 and 36 reach an inclination at right angles to the links 30 and 34, i.e. the parallelogram linkage has assumed a rectangular shape, the operator knows that no further upward movement of the blade segment is possible, and that replacement is necessary. If desired, an external, calibrated scale or other indication system could be provided adjacent a link 32, 36 to provide the operator with an accurate assessment of the inclination of these links at any given time.

FIGS. 6 and 7 show a further, currently preferred embodiment of the invention. Components in these Figures which correspond to components of the earlier embodiments are once again indicated with the same reference numerals. In FIG. 6, the conveyor belt is omitted in the interests of clarity numeral 12 in FIG. 7. The direction of movement is indicated with the numeral 80.

In FIGS. 6 and 7, the parallelogram linkages 28 are welded to a sleeve 82 which is mounted slidably on the cross-bar 42 and which can be anchored at any desired position, chosen to suit the lateral position of the belt, by means of a locking screw 84 (FIG. 7). The ends of the cross-bar 42 are supported in blocks 86 carried by sleeves 88 which can slide up and down threaded posts 90. The sleeves 88, and hence the cross-bar 42, can be set by appropriate adjustment of locknuts 92 and 94 on the posts 90. The posts 90 have feet 96 which can be mounted to a horizontal support structure (not shown).

As in the earlier embodiments, each parallelogram linkage 28 has four links 30, 32, 34 and 36. The upper link 30 in each case extends past its hinged connection to the upright link 32 and carries a support bar 98 to which the associated blade segment 22 is connected. For each blade segment, a flexible flap 100 of plastics material is also attached to the support bar by means of screws 102. As illustrated in FIG. 6, the flaps 100, in combination, form a flexible curtain against which material scraped from the conveyor belt will fall, the curtain deflecting the falling debris away from the parallelogram linkages to reduce the chances of fouling or jamming thereof.

As in the first embodiment, a tube 44 passes through all of the parallelogram linkages. At its end, the tube is closed off by a plug member 104 to which an air hose 48 is connected. In this case, the air hose 48 and tube 44 are supplied with air under pressure from a source in the form of a compressed air cylinder 50. A pressure regulating valve 106 is included in the hose 48.

The setting of the pressure regulating valve 106 determines the constant air pressure which is supplied to the tube 44, and hence determines the upward force which biases the blade segments 22 into contact with the belt surface.

The embodiment of FIGS. 6 and 7 operates in exactly the same way as the embodiment of FIGS. 1 to 3 and it will be appreciated that the various modifications and refinements discussed above in relation to the earlier embodiments could also be incorporated in this embodiment.

In the three embodiments described above, the scraper blade 20 is of a segmented construction. Nevertheless it is also within the scope of the invention for the scraper blade to have a single blade only which is biased against the belt surface by gas pressure. There could, for instance, be a single parallelogram linkage which is deformed by an inflatable tube arranged like the tube 44 or like a tube 58. While such an arrangement would still enjoy the advantage of a generally constant biasing force and constant blade inclination as wear of the blade takes place, there would of course be no facility to take account of differential wear at different positions along the length of the blade.

Referring again to FIG. 6, short deflectors, each in the form of a length of angle section steel can be fixed to the upper link of each parallelogram linkage with the apex of the angle pointing upwardly. These deflectors, a typical deflector of which is indicated with the reference numeral 103, serve to deflect material which is scraped from the belt surface to the sides of the parallelogram linkages and reduce the likelihood of fouling thereof.

From the above it will be apparent that a major advantage of each of the described embodiments is the use of a parallelogram linkage to support the blade segments, since such linkages enable the blade segments to move independently, at the correct orientation, into contact with the belt surface. This advantage can be retained in other embodiments of the invention where the inflatable tube 44 of the embodiments of FIGS. 1 to 3 and FIGS. 6 and 7 is replaced by an elongate biasing member that applies the appropriate biasing force to each of the parallelogram linkages. In a simple version of such an embodiment, the biasing member could, for instance, be in the form of a resilient, but nevertheless fairly stiff, unpressurised tube that extends through all of the parallelogram linkages.

I claim:

1. A conveyor belt scraper comprising:

a segmented scraper blade which includes a plurality of blade segments arranged side by side with one another such that in use each blade segment can scrape a portion of the width of a conveyor belt surface, a plurality of blade segment supports on which the blade segments are supported, each blade segment support including a linkage of pivotally interconnected links forming a closed parallelogram linkage, a support structure for supporting the parallelogram linkages in side by side relationship with one another and adjacent the conveyor belt surface which is to be scraped, and gas-inflatable biasing means located inside of and acting on each of the parallelogram linkages such that inflation thereof causes the linkages to deform in a manner to displace the blade segments in a direction lengthwise of the belt and towards the belt surface, each blade segment moving parallel to itself and maintaining a constant inclination to the vertical during such displacement.

2. A conveyor belt scraper according to claim 1 wherein the gas-inflatable biasing means comprises a flexible, inflatable tube that is positioned to extend, in a direction transverse to the length of the conveyor belt, through all of the parallelogram linkages.

3. A conveyor belt scraper according to therefor claim 2 wherein the tube is partially filled with a liquid.

4. A conveyor belt scraper according to claim 2 wherein the fully inflated diameter of the tube is greater than or equal to the clear internal dimension of each parallelogram linkage.

5. A conveyor belt scraper according to claim 4, wherein the tube is partially filled with a liquid.

6. A conveyor belt scraper according to claim 4 and comprising a source of compressed gas for inflating the tube, and means for regulating the pressure of the compressed gas to a substantially constant value at least during normal operation.

7. A conveyor belt scraper according to claim 6, wherein the tube is partially filled with a liquid.

8. A conveyor belt scraper according to therefor claim 6 and comprising a metal detector, located upstream of the scraper blade, to detect metallic projections on the belt surface as they approach the scraper blade, and control means operating in response to such detection to decrease the inflation pressure of the gas inflatable biasing means temporarily during passage of the metal projections past the scraper blade.

9. A conveyor belt scraper according to claim 6 wherein the source of compressed gas is a pressure vessel charged with air under pressure.

10. A conveyor belt scraper according to claim 9, further comprising a metal detectors located upstream of the scraper blade, to detect metallic projections on the belt surface as they approach the scraper blade, and control means operating in response to such detection to decrease the inflation pressure of the gas inflatable biasing means temporarily during passage of the metal projections past the scraper blade.

11. A conveyor belt scraper according to claim 6 wherein the source of compressed gas is an air compressor.

12. A conveyor belt scraper according to claim 11, further comprising a mealy detector, located upstream of the scraper blade, to detect metallic projections on the belt surface as they approach the scraper blade, and control means operating in response to such detection to decrease the inflation pressure of the gas inflatable biasing means temporarily during passage of the metal projections past the scraper blade.

13. A conveyor belt scraper according to claim 1 comprising separate, flexible, inflatable hoses located inside the linkages, the ends of the hoses being attached to opposite links of the associated linkages such that inflation of the hoses causes them to straighten out with resultant deformation of the linkages in a manner to displace the blade segments towards the belt surface.

14. A conveyor belt scraper according to therefor claim 13 wherein the hoses are partially filled with a liquid.

15. A conveyor belt scraper according to claim 13 wherein the hoses are inflatable independently of one another.

16. A conveyor belt scraper according to claim 15, wherein the hoses are partially tilled with a liquid.

17. A conveyor belt scraper according to claim 13 wherein all the hoses are connected to a manifold through which all the hoses are simultaneously inflatable.

18. A conveyor belt scraper according to claim 17, wherein the hoses are partially filled with a liquid.

19. A conveyor belt scraper according to claim 17 and comprising a source of compressed gas for inflating the hoses and means for regulating the pressure of the compressed gas to a substantially constant value at least during normal operation.

20. A conveyor belt scraper according to claim 19, wherein the source of compressed gas is a pressure vessel charged with air under pressure.

21. A conveyor belt scraper according to claim 19, wherein the source of compressed gas is an air compressor.

22. A conveyor belt scraper according to claim 19, further comprising a metal detector. located upstream of the scraper blade, to detect metallic projections on the belt surface as they approach the scraper blade, and control means operating in response to such detection to decrease the inflation pressure of the gas inflatable biasing, means temporarily during passage of the metal projections past the scraper blade.

23. A conveyor belt scraper according to claim 19, wherein the hoses arc partially tilled with a liquid.

24. A conveyor belt scraper comprising:

a segmented scraper blade which includes a plurality of blade segments arranged side by side with one another such that in use each blade segment can scrape a portion of the width of a conveyor belt surface, for each segment of the scraper blade, a blade segment support on which the blade segment is supported, each blade segment support including a linkage of pivotally interconnected links forming a closed parallelogram linkage, a support structure for supporting the parallelogram linkages in side by side relationship with one another and adjacent the conveyor belt surface which is to be scraped, and an elongate, resilient biasing member that is positioned to extend, in a direction transverse to the length of the conveyor belt, through all of the parallelogram linkages so as to bias the linkages in a manner to urge the blade segments towards the belt surface.

25. A conveyor belt scraper according to claim 24 wherein the biasing member is a resilient tube.

26. A conveyor belt scraper according to claim 25, wherein each closed parallelogram linkage comprises upper and lower links which are generally parallel to the belt surface and parallel side links which are transverse to the belt surface and spaced apart from one another in the lengthwise direction of the belt, the side links being connected pivotally between the upper and lower links and the upper link including an extension carrying a bracket to which an associated scraper blade segment is releasably attached.

27. A conveyor belt scraper according to therefor claim 24 wherein each closed parallelogram linkage comprises upper and lower links which are generally parallel to the belt surface and parallel side links which are transverse to the belt surface and spaced apart from one another in the lengthwise direction of the belt, the side links being connected pivotally between the upper and lower links and the upper link including an extension carrying a bracket to which an associated scraper blade segment is releasably attached.

28. A conveyor belt scraper according to claim 27 wherein the support structure comprises a cross-bar which spans across the width of the conveyor belt and has its ends connected to height-adjustable structures on either side of the belt, the parallelogram linkages being mounted to the cross-bar.

29. A conveyor belt scraper according to claim 28 wherein the lower links of the parallelogram linkages are mounted to a sleeve located on the cross-bar.

\* \* \* \* \*